June 23, 1931. I. EVANS 1,811,463
HEDGE TRIMMER
Filed June 20, 1928 3 Sheets-Sheet 1
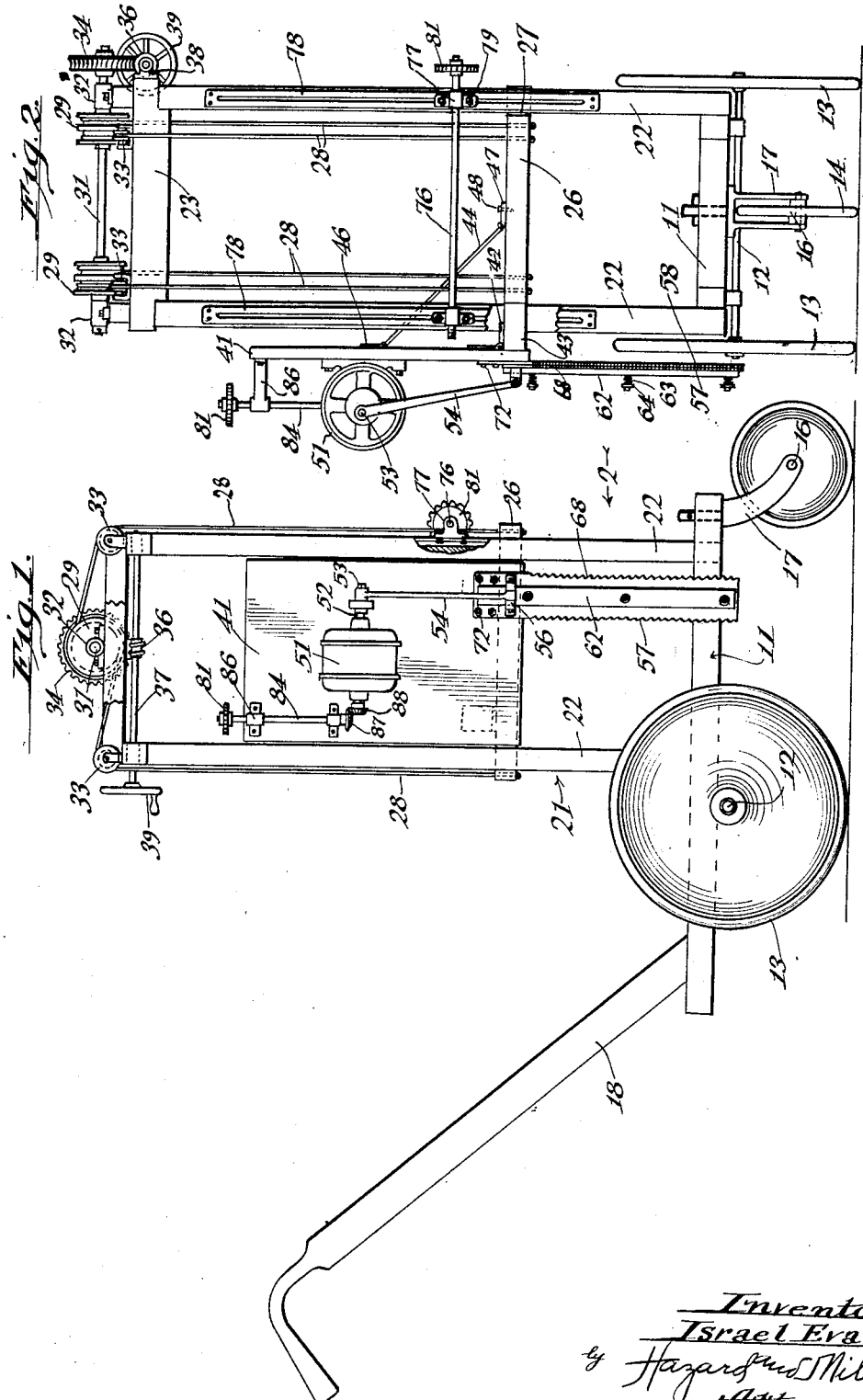
Inventor
Israel Evans
by Hazard and Miller
Attorneys June 23, 1931.  I. EVANS  1,811,463
HEDGE TRIMMER
Filed June 20, 1928   3 Sheets-Sheet 2
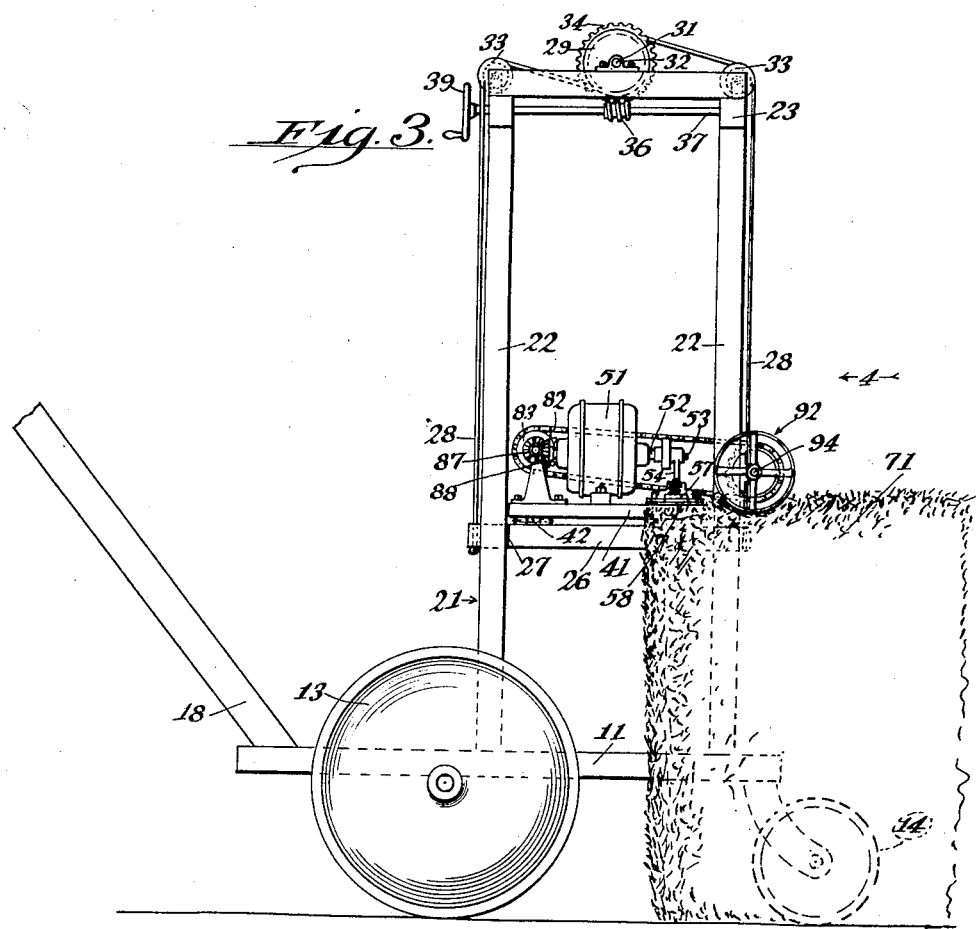
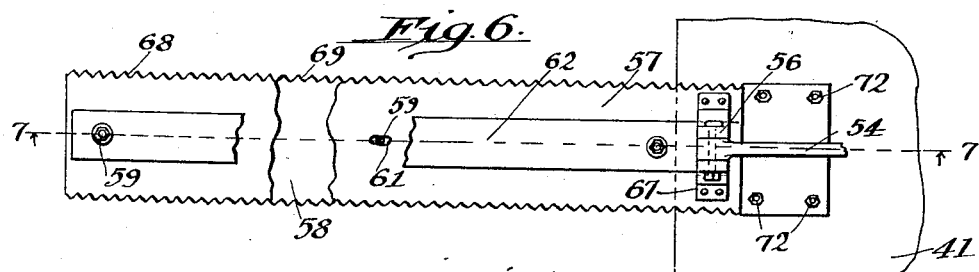
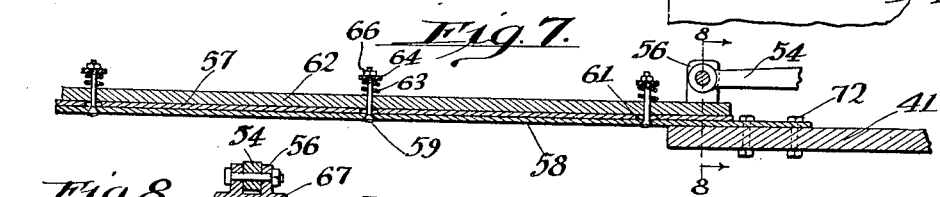
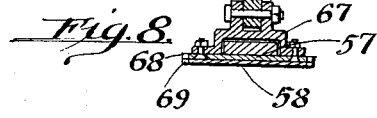

June 23, 1931.  I. EVANS  1,811,463
HEDGE TRIMMER
Filed June 20, 1928   3 Sheets-Sheet 3
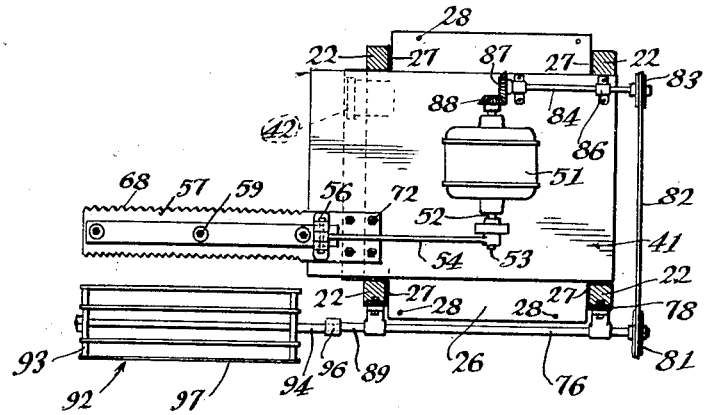
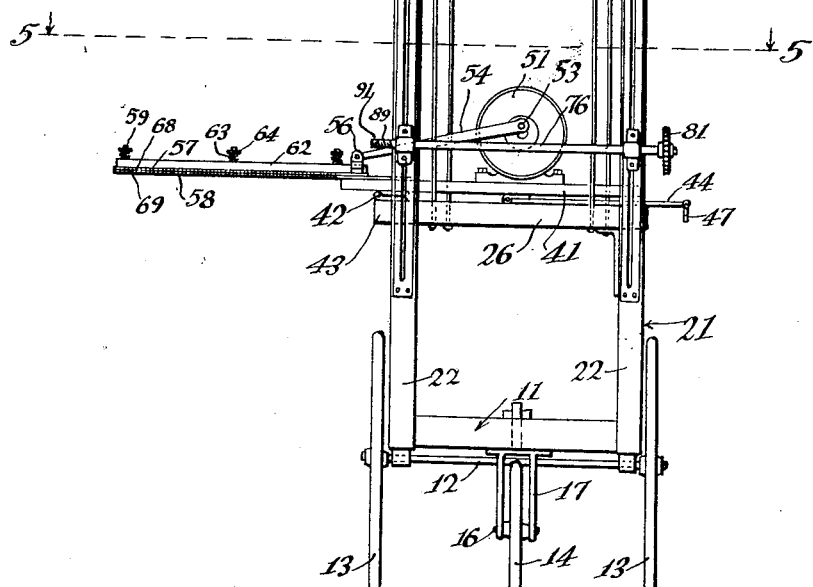

Patented June 23, 1931

1,811,463

UNITED STATES PATENT OFFICE

ISRAEL EVANS, OF SAN BERNARDINO, CALIFORNIA

HEDGE TRIMMER

Application filed June 20, 1928. Serial No. 286,783.

This invention relates to harvesters, and more especially to a machine for trimming hedges or rows of plants.

An object of the invention is the provision of a power-driven hedge trimmer.

A further object is the provision of a hedge trimmer adapted to trim both the top and sides of a hedge.

A further object is the provision of a hedge trimmer wherein the same cutter may be employed for trimming either the top or side of a hedge by positioning the cutter to extend either horizontally or vertically from the trimmer.

Another object is the provision of a trimmer of the general class described, provided with a double-edged, reciprocating cutter so that the trimmer may be advanced along the hedge in either direction during operation.

A still further object is the provision of a hedge trimmer of the general class described, which is provided with a rotating reel for forcing the hedge against the cutting knife.

A still further object is the provision of a hedge trimmer supported upon a movable carriage to permit the trimmer to be advanced along the hedge during operation, and in which the trimming means is carried by a vertically adjustable platform so that hedges of different heights may be trimmed.

The invention possesses other objects and features of advantage, some of which, with the foregoing, will be set forth in the following description of the preferred form of the invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is a side elevation of the hedge trimmer of my invention, with the cutting blade disposed vertically in position to trim the side of a hedge.

Fig. 2 is an end elevation, the direction of view being indicated by the arrow 2 of Fig. 1.

Fig. 3 is a view similar to Fig. 1, a portion of the figure being broken away to reduce its length, and showing the cutting blade extended horizontally from the trimmer in position to trim the top of a hedge.

Fig. 4 is an end elevation of the trimmer, with the parts shown in the position indicated upon Fig. 3. The direction of view is indicated by the arrow 4 of Fig. 3.

Fig. 5 is a sectional view taken through the framework of the trimmer, as indicated by the line 5—5 of Fig. 4.

Fig. 6 is an enlarged, detailed view of the cutting blade and guard.

Fig. 7 is a vertical sectional view taken upon the line 7—7 of Fig. 6.

Fig. 8 is a transverse, vertical sectional view taken upon the line 8—8 of Fig. 7, with the direction of view indicated by the arrows.

Broadly considered, the hedge trimmer of my invention comprises a movable carriage mounted preferably upon wheels to facilitate advancing the trimmer along a hedge during the process of trimming. The carriage is provided with a suitable stationary framework upon which a platform is vertically adjustable. The trimming means and the motive power therefor, are mounted upon this platform in such a way that the trimming means may extend either horizontally or vertically to trim either the top or a side respectively, of a hedge or row of plants. The trimmer is further provided with a power-driven revolving reel for forcing the branches of the hedge against the cutting blade to insure better and more positive action thereof. The reel derives its power from the same source as that activating the cutting means.

Specifically describing the invention in one of its preferred embodiments, a carriage 11 is provided with a preferably stationary axle 12 extending transversely of the carriage 11 and having a wheel 13 revolubly mounted upon each end thereof. A guide wheel 14 is revolubly mounted upon an axle 16 supported upon a fork 17 which is pivotally mounted adjacent the front of the carriage 11. Preferably a pair of operating handles 18 are rigidly secured to the after end of the carriage 11 by means of which the carriage 11 may be propelled and guided.

A framework 21 is mounted rigidly upon the carriage 11 and preferably comprises four posts 22 rigidly mounted at their lower ends upon the carriage 11 to extend vertically therefrom. The posts 22 are spaced at their upper ends by suitable braces 23.

A platform 26 is slidably arranged between the posts 22 and is retained therebetween by being provided with a notch 27 at each corner within which the adjacent post 22 is disposed. The platform 26 is supported by preferably a plurality of cables 28, each of which is secured at one end to the platform 26 and wound upon a drum 29. All the drums 29 are affixed to a single shaft 31 which is journaled in suitable bearings 32 at the top of the framework 21, it being understood that each of the cables 28 passes over an intermediate pulley 33 before being wound in that direction upon its respective drum which will effect raising both sides of the platform 26 when the shaft 31 is rotated in one direction, and permit the platform 26 when the shaft 31 is rotated in the opposite direction, to be lowered.

Means for rotating the shaft 31 are provided in the form of a worm gear 34 affixed to the shaft 31 and enmeshed with a worm 36 carried by a shaft 37 journalled in bearings 38 adjacent the top of the framework 21. A hand wheel 39 is affixed to the shaft 37 to effect ready manipulation thereof to rotate the shaft 31 and drums 29.

A dummy platform 41 is hinged as at 42, adjacent one of the lateral edges of the platform 26, so that the dummy platform 41 may be disposed either horizontally over the platform 26 as clearly shown upon Fig. 4, or vertically at one side of the framework 21, as best shown upon Fig. 2. That edge 43 of the platform 26 to which the dummy platform 41 is hinged, extends far enough beyond the adjacent side of the framework 21 so that when the dummy platform is disposed vertically, it is outside of the wheel 13 on the same side of the carriage 11.

A brace 44 is pivoted at one end to a bracket 46 carried by the dummy platform 41, and has a bifurcated foot 47 pivoted to its other end. The foot 47 may be engaged under the head of a pin 48 as shown upon Fig. 2, to releasably lock the dummy platform 41 in vertical position.

An electric motor 51 is mounted upon the dummy platform 41; and the shaft 52 of the motor is provided at one end with an eccentric crank 53 upon which one end of a connecting rod 54 is journaled. The other end of the connecting rod 54 is pivotally connected to a bracket 56 which is rigid with a cutting blade 57 which is slidable longitudinally upon a knife guard 58 extending rigidly from the hinged edge of the dummy platform 41. The knife 57 is limited to longitudinal movement by means of a plurality of headed pins 59 rigid with the knife guard 58 and each extending through a longitudinally disposed slot 61 in the knife 57. A plate 62 rests upon the top of the cutting blade 57 and is retained in position by the pins 59 which extend through apertures therein. A spring 63 is disposed about each of the pins 59 and is under compression between the plate 62 and a washer 64 urged against the spring 63 by a nut 66 threaded upon the associated pin 59, thus resiliently pressing the knife 57 against the knife guard 58.

A saddle 67 is rigidly attached to the knife 57 and supports the bracket 56 to which the connecting rod 54 is pivoted, with the result that when the motor 51 is energized to rotate its shaft 52 and the crank 53, the connecting rod 54 will reciprocate the knife 57 longitudinally between the knife guard 58 and the presser plate 62. Both lateral edges of both the knife 57 and guard 58 are serrated, being provided with a plurality of teeth 68 and 69 respectively, so that as the knife 57 is reciprocated, the teeth 68 travel backwards and forwards across the teeth 69 to cut any branches interposed between any two teeth. Since the knife 57 and guard 58 are serrated on both edges, the trimmer may be advanced in either direction along the hedge 71 to effectually carry out the trimming operation.

It is to be understood that the guard 58 and knife 57 extend from the dummy platform 41 in parallelism therewith, being affixed to the upper surface of the dummy platform 41, any suitable means such as bolts 72 being employed for attaching the guard 58 to the dummy platform 41. Therefore, the trimming means may be disposed either horizontally or vertically by positioning the dummy platform 41 horizontally or vertically respectively, it being understood that when the top of the hedge 71 is to be trimmed, the dummy platform 41 and trimming means should be disposed horizontally, and when a side of the hedge 71 is to be trimmed, the dummy platform 41 and trimming means are to be disposed vertically.

A shaft 76 extends transversely of the framework 21, extending perpendicularly to a plane including the edge 43 of the platform 26, and consequently, parallel to the cutting blade 57 and guard 58 when the latter are arranged horizontally. The shaft 76 is revolubly mounted within a journal 77 which is vertically adjustable upon each of two of the posts 22 of the framework 21. This vertical adjustment is made possible by means of a slotted guideway 78 upon each of the associated posts 22, for the reception of the heads of the bolts 79 holding the journals 77 against the guides 78. One end of the shaft 76 is provided with a sprocket 81 adapted to receive a chain 82. The chain 82 may also be received upon another sprocket 83 carried by a shaft 84 revolubly mounted in journals 86 rigid with the dummy platform 41. A beveled gear 87 is carried by the shaft 84 in mesh with another beveled gear 88 which is carried by the shaft 52 of the motor 51 so that when the motor 51 is energized and the chain 82 is positioned upon the sprockets 81 and 83, the shaft 76 is revolved.

The end 89 of the shaft 76 opposite the sprocket 81, is provided with threads 91 affording means for mounting a reel 92 for rotation with the shaft 76. This reel 92 comprises a pair of spaced heads 93 mounted upon a central shaft 94 which has a socket 96 at one end threaded interiorly for reception upon the threads 91. A plurality of bars 97 extend between the heads 93, being attached thereto at their respective peripheries. As clearly shown upon Fig. 5, the reel 92 is slightly in advance of the knife 57 and guard 58, it being understood that the platform 26 and journals 77 have both been adjusted vertically so that the knife 57 and the bottom of the reel 92 are in substantial horizontal alignment. Thus by rotating the reel 92 through its connection to the motor 51, the reel 92 presses the branches and leaves of the hedge 71 being trimmed, into better engagement with the cutting blade 57 to obtain cleaner and truer trimming of the hedge.

As the operations of the different parts of the machine have been explained in connection with the descriptions of the details thereof, further reference to the operation of the machine as a whole, is unnecessary.

I claim:

1. A hedge trimmer comprising a movable carriage, a framework carried thereby, a platform vertically slidable upon said framework, a serrated knife guard extending from said platform, a serrated knife slidable longitudinally upon said guard, and means carried by said platform for reciprocating said knife upon the guard, said platform being hingedly supported to permit its being positioned optionally with the guard and knife disposed horizontally or vertically.

2. A hedge trimmer comprising a movable carriage, a framework carried thereby, a platform vertically slidable upon said framework, means for moving said platform vertically upon the framework to selected elevation, trimming means carried by said platform and extending from the framework, and a motor carried by said platform for actuating said trimming means.

3. A hedge trimmer comprising a movable carriage, a framework carried thereby, a platform vertically slidable upon said framework, means for moving said platform vertically upon the framework to selected elevation, a serrated knife guard extending from said platform, a serrated knife slidable longitudinally upon said guard, and a motor carried by said platform for reciprocating said knife upon the guard, said platform being hingedly supported to permit its being positioned optionally with the guard and knife disposed horizontally or vertically.

4. A hedge trimmer comprising a movable carriage, a framework carried thereby, a platform vertically slidable upon said framework, a drum revolubly mounted adjacent the top of said framework, a cable connected to said platform and wound upon the drum, a worm wheel mounted for rotation with the drum, a worm revolubly mounted upon the framework in operative engagement with the worm wheel, means for rotating the worm, a serrated knife guard extending from said platform, a serrated knife slidable longitudinally upon said guard, and means carried by said platform for reciprocating said knife upon the guard, said platform being hingedly supported to permit its being positioned optionally with the guard and knife disposed horizontally or vertically.

5. A hedge trimmer comprising a movable carriage, a framework carried thereby, a platform vertically slidable upon said framework, a serrated knife guard extending from said platform, a serrated knife slidable longitudinally upon said guard, a revolubly and adjustably mounted reel carried by said framework in advance of said knife and guard to press the hedge against the knife, and means carried by said platform for reciprocating said knife upon the guard.

6. A hedge trimmer comprising a movable carriage, a framework carried thereby, a platform vertically slidable upon said framework, a serrated knife guard extending from said platform, a serrated knife slidable longitudinally upon said guard, and means carried by said platform for reciprocating said knife upon the guard, a revolubly mounted reel carried by said framework in advance of said knife and guard to press the hedge against the knife, means for adjusting said reel and for revolubly securing the reel in operative position in respect to the knife and guard, said platform being hingedly supported to permit its being positioned optionally with the guard and knife disposed horizontally or vertically.

7. A hedge trimmer comprising a movable carriage, a framework carried thereby, a platform vertically slidable upon said framework, a drum revolubly mounted adjacent the top of said framework, a cable connected to said platform and wound upon the drum, a worm wheel mounted for rotation with the drum, a worm revolubly mounted upon the framework in operative engagement with the worm wheel, means for rotating the worm, a serrated knife guard extending from said platform, a serrated knife slidable longitudinally upon said guard, a revolubly mounted reel carried by said framework in advance of said knife and guard to press the hedge against the knife, and means carried by said platform for reciprocating said knife upon the guard, said platform being hingedly supported to permit its being positioned optionally with the guard and knife disposed horizontally or vertically.

8. A hedge trimmer comprising a movable carriage, a framework carried thereby, a platform vertically slidable upon said framework, a drum revolubly mounted at the top of the framework, a cable wound upon the drum and connected to said platform, means for turning said drum to vary the elevation of the platform and for restraining the drum against being rotated by the pull of the cable, a dummy platform hinged to said platform to permit it being disposed optionally horizontally across the framework or vertically at one side thereof, means for releasably locking said dummy platform in vertical position, a motor mounted upon said dummy platform, an eccentric crank driven by the motor, a serrated knife guard extending rigidly from said dummy platform, a serrated knife slidable upon said guard and a connecting rod journaled at one end upon said knife and at the other end upon said frame.

9. A hedge trimmer comprising a movable carriage, a framework carried thereby, a platform vertically slidable upon said framework, a drum revolubly mounted at the top of the framework, a cable wound upon the drum and connected to said platform, means for turning said drum to vary the elevation of the platform and for restraining the drum against being rotated by the pull of the cable, a dummy platform hinged to said platform to permit it being disposed optionally horizontally across the framework or vertically at one side thereof, means for releasably locking said dummy platform in vertical position, a motor mounted upon said dummy platform, an eccentric crank driven by the motor, a knife guard serrated upon both lateral edges and extending rigidly from said dummy platform, a double-edged, serrated knife slidable upon said guard and a connecting rod journaled at one end upon said knife and at the other end upon said frame.

10. A hedge trimmer comprising a movable carriage, a framework carried thereby, a platform vertically slidable upon said framework, a drum revolubly mounted at the top of the framework, a cable wound upon the drum and connected to said platform, means for turning said drum to vary the elevation of the platform and for restraining the drum against being rotated by the pull of the cable, a dummy platform hinged to said platform to permit it being disposed optionally horizontally across the framework or vertically at one side thereof, means for releasably locking said dummy platform in vertical position, a motor mounted upon said dummy platform, an eccentric crank driven by the motor, a knife guard serrated upon both lateral edges and extending rigidly from said dummy platform, a double-edged, serrated knife slidable upon said guard, headed pins rigid with said guard and extending through longitudinally disposed slots in said knife, a spring under compression between the head of each of said pins and the knife, and a connecting rod journaled at one end upon said knife and at the other end upon said frame.

11. A hedge trimmer as claimed in claim 10, comprising in addition a pair of journals vertically adjustable upon the framework, a shaft revoluble within said journals, a reel removably securable to said shaft to extend parallel to said knife and guard and slightly in advance thereof, and means for connecting said shaft to the motor to be driven thereby.

In testimony whereof I have signed my name to this specification.

ISRAEL EVANS.